United States Patent [19]
Schopper et al.

[11] 4,392,691
[45] Jul. 12, 1983

[54] DUAL-CIRCUIT PRESSURE CONTROL VALVES

[75] Inventors: Bernd Schopper, Frankfurt am Main; Derek Lowe, Glashuetten; Hans-Dieter Reinartz, Frankfurt am Main; Peter Tandler, Falkenstein, all of Fed. Rep. of Germany

[73] Assignee: ITT Industries, Inc., New York, N.Y.

[21] Appl. No.: 221,250

[22] Filed: Dec. 30, 1980

[30] Foreign Application Priority Data

Jan. 22, 1980 [DE] Fed. Rep. of Germany ....... 3002135

[51] Int. Cl.³ ............................................. B60T 11/34
[52] U.S. Cl. .................................... 303/6 C; 188/349; 303/22 R
[58] Field of Search .......... 303/6 C, 6 R, 6 A, 50–56, 303/60, 8, 22 R, 22 A; 188/349, 195, 345, 354

[56] References Cited

U.S. PATENT DOCUMENTS

| | | | |
|---|---|---|---|
| 3,731,981 | 5/1973 | Bueler | 303/6 C X |
| 3,977,735 | 8/1976 | Bush et al. | 303/22 R |
| 4,111,494 | 9/1978 | Young | 303/6 C |
| 4,199,196 | 4/1980 | Teluo | 303/6 C |
| 4,203,627 | 5/1980 | Kono | 303/6 C |

FOREIGN PATENT DOCUMENTS 2748699 5/1978 Fed. Rep. of Germany .
2008216 5/1979 United Kingdom ............... 303/6 C

*Primary Examiner*—Douglas C. Butler
*Attorney, Agent, or Firm*—John T. O'Halloran; Alfred C. Hill

[57] ABSTRACT

In a known dual-circuit braking pressure control valve, a tilting lever arrangement is provided for distribution of the preloading force to the two control pistons, whereby the change-over point of the intact brake circuit is increased upon failure of one brake circuit. The tilting lever arrangement is complicated with respect to its construction and assembly, and its mode of operation is not safe. According to the present invention the tilting lever arrangement is replaced by a carrier bridge at the ends of the two pistons which synchronizes the points of application of the preloading forces by allowing a slight relative movement betweeen the two pistons when both of the brake circuits are operative.

21 Claims, 6 Drawing Figures

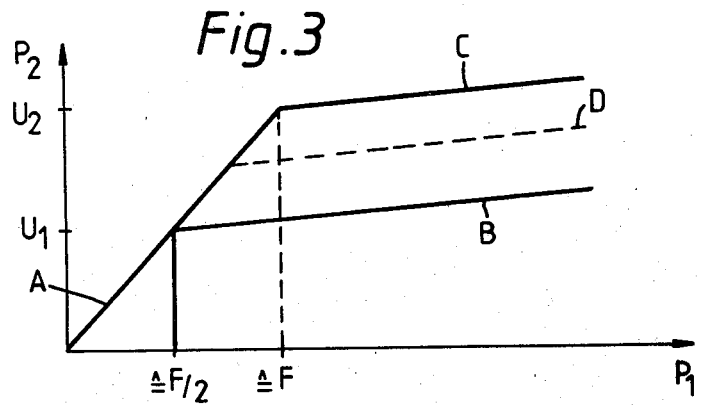
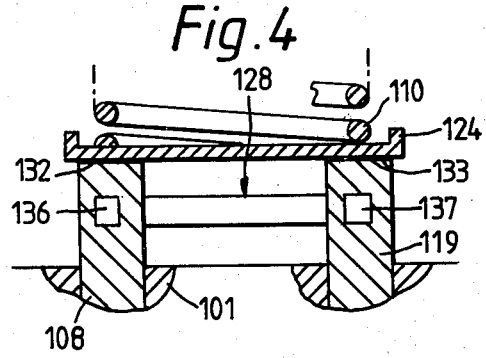
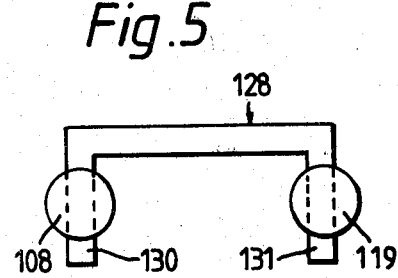
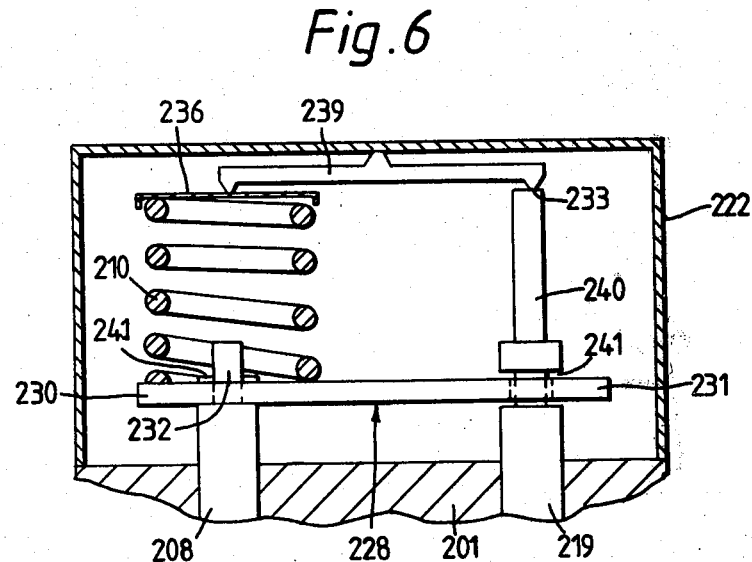

DUAL-CIRCUIT PRESSURE CONTROL VALVES

BACKGROUND OF THE INVENTION

The present invention relates to a dual-circuit pressure control valve for hydraulic brake systems including two control pistons arranged in parallel side by side and each assigned to a different one of two brake circuits, the control pistons being loaded by a preloading force which increases at the control piston of the operable brake circuit upon a pressure failure in one brake circuit.

In a known pressure control valve of the aforementioned type (German Pat. DE-OS No. 27 48 699), one half of the force of a common preloading helical spring is transmitted to the point of application at the upper end surface of each of the pistons. Upon failure of one brake circuit, the distribution element bears against the control piston remaining in its rest position due to the failure and is tilted by the piston in operation, so that the latter piston is loaded by the entire spring force resulting in an increase of the changeover point in the associated brake circuit. This tilting movement of the distribution element is detrimental in many cases. For instance, the distribution element is guided by a foot in an axial bore and becomes jammed therein when tilted and the spring is loaded unsymmetrically due to the tilting and, hence, requires a guidance which in turn tends to be jammed.

SUMMARY OF THE INVENTION

It is an object of the present invention to provide a dual-circuit pressure control valve of the type referred to hereinabove having a simple construction, a safe mode of operation and eliminating the necessity of a tiltable distribution element.

A feature of the present invention is the provision of a dual-circuit pressure control valve comprising: two control pistons disposed in a housing in a parallel side-by-side relationship, each of the two pistons being associated with a different one of two brake circuits; and an arrangement to apply a preloading force to each of the two pistons such that, upon failure of one of the two circuits, the preloading force on that one of the two pistons associated with the other of the two circuits is increased, the arrangement including a carrier bridge synchronizing a point of application of each of the two preloading forces by allowing a slight relative movement between the two pistons when both of the circuits are operative.

In this construction, the carrier bridge is not effective during normal opertion because a very small relative movement is sufficient to have both control pistons operate independently of each other. But if one brake circuit fails, the preloading force associated with the control piston of the failed brake circuit will be coupled via the carrier bridge to the other control piston, so that the latter's change-over point will occur in the desired manner at a higher braking pressure. In the reverse case, the point of application of the preloading force on the control piston of the failed brake circuit is entrained by the carrier bridge, so that a possibly existing distribution element will undergo only a slight tilt at the most which does not disturb the operation. The necessity of using a distribution element may even be totally eliminated if, for example, each control piston is loaded by a preloading device of its own.

In one embodiment, the carrier bridge interconnects the two control pistons. The carrier bridge suitably engages the portions of the control pistons projecting from the housing.

Another possible embodiment includes having the points of application of the preloading forces located on pressure members acting on the front surfaces of the pistons and to interconnect these pressure members by the carrier bridge. In this case, the control piston associated with the failed brake circuit will remain in its rest position, while the pressure member associated with the other piston shifts. Furthermore, it is advantageous to have the control pistons loaded by axial forces only.

To enable the slight relative movement, the link of the carrier bridge may include a lost motion arrangement on at least one end portion.

In another preferred embodiment, the carrier bridge is constructed resiliently. This affords the further advantage that in the event of failure of the one brake circuit, the preloading force assigned to the other brake circuit is not limited to double the value of the normal preloading force, but may be set to any desired intermediate values by appropriately selecting the spring or resilient characteristic.

In a preferred embodiment, the carrier bridge includes a pivot axle extending parallel to the plane containing the axes of the pistons and two lever arms rigidly fixed thereto. It is ensured by this pivot axle that the carrier bridge transmits at its end portions substantially axial forces only, although being in direct communication with the control pistons.

In this arrangement, the axle of the carrier bridge may be a torsion rod, which results in a very compact construction.

If the preloading forces of the two control pistons are generated by a common helical spring, it is preferred to use a spring retainer overlapping both points of application upon which the helical spring abuts. The spring retainer may furthermore have a centering shoulder bearing against the carrier bridge. There is no fear of jamming in this case, since the spring retainer causes only a slight tilting movement at the most.

Were the preloading forces for both control pistons are generated by a common spring, it is possible to have one end of the spring act on one point of application of force and to have the other end of the spring act on the other point of application of force by interposing a direction-reversing device. With this arrangement the spring can be a helical spring, a torsion spring or any other type of spring desired.

BRIEF DESCRIPTION OF THE DRAWING

Above-mentioned and other features and objects of this invention will become more apparent by reference to the following description taken in conjunction with the accompanying drawing, in which:

FIG. 3 is a graph of the outlet pressure $P_2$ of the control valve as a function of the inlet pressure $P_1$;

FIG. 4 is a partial cross-sectional view of a second embodiment of a dual-circuit pressure control valve in accordance with the principles of the present invention;

FIG. 5 is a top view of the two control pistons of FIG. 4; and

FIG. 6 is a partial cross-sectional view of a third embodiment of a dual-circuit pressure control valve in accordance with the principles of the present invention.

DESCRIPTION OF THE PREFERRED EMBODIMENT

Figure 1:
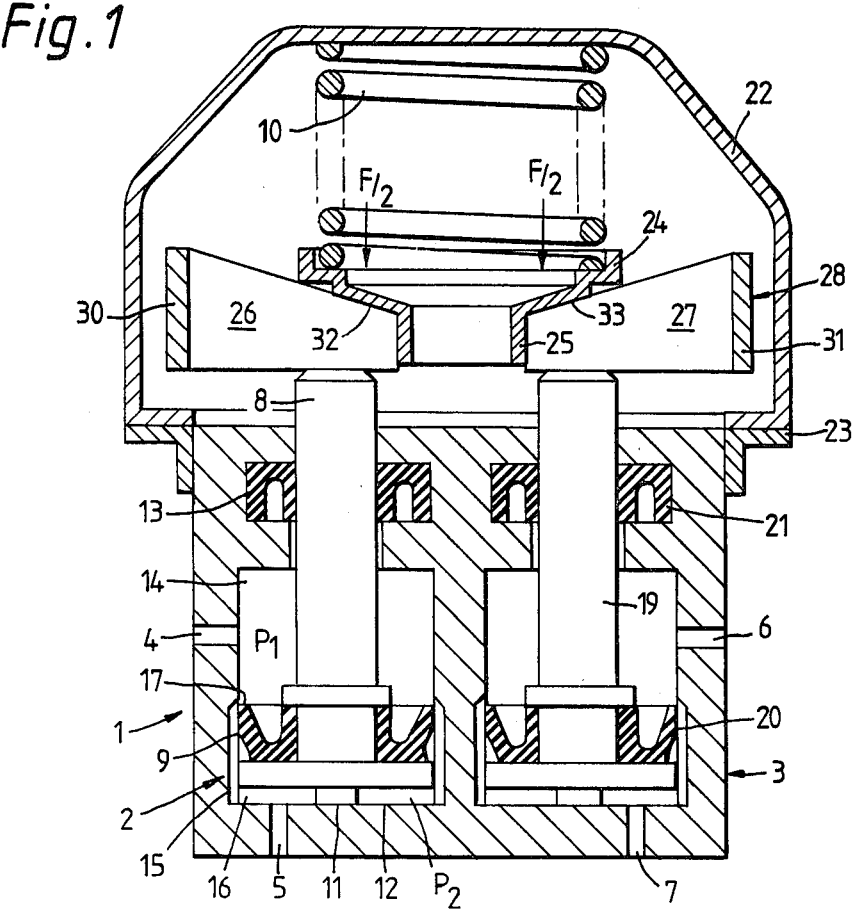
FIG. 1 is a longitudinal cross-sectional view of a first embodiment of a dual-circuit pressure control valve in accordance with the principles of the present invention taken along the line I—I of FIG. 2.
Figure 2:
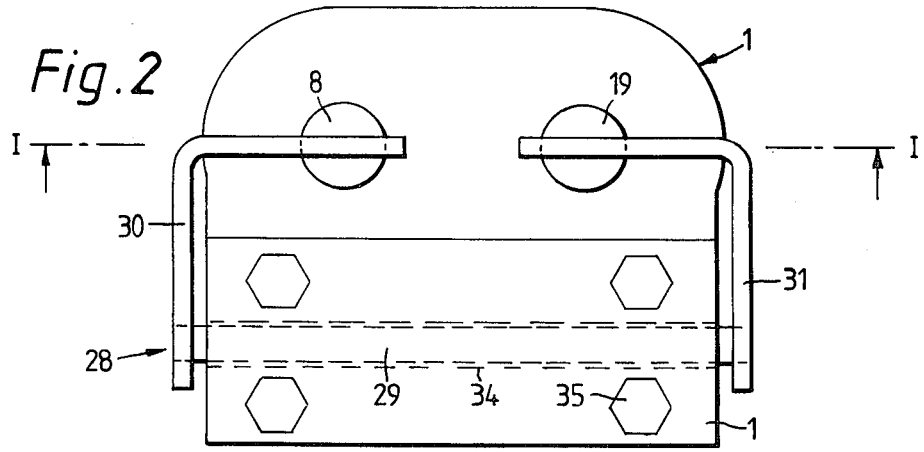
FIG. 2 is a top view of the control valve of FIG. 1 with the cap and the spring retainer removed.

In the embodiment of FIGS. 1 and 2, the two pressure control valves 2 and 3 are arranged in a schematically illustrated housing 1 each controlling the pressure in a different one of two brake circuits. Pressure control valve 2 is provided with an inlet 4 and an outlet 5 and pressure control valve 3 is provided with an inlet 6 and an outlet 7. For example, the inlets 4 and 6 are connected to a different one of the outlet pressure chambers of a tandem master cylinder operated by a brake pedal while the outlets each lead to a different one of the rear-wheel brake cylinders of an automotive vehicle.

Pressure control valve 2 has a control piston 8 carrying a sealing sleeve 9 and being pressed down with a specific preload by a helical spring 10 common to both pressure control valves 2 and 3. Control piston 8 will therefore have its lower end surface 11 in abutment with the housing bottom 12 in the rest position. Control piston 8 is sealed by seal 13 to housing 1. In the illustrated rest position, inlet chamber 14 is in communication with outlet chamber 16 via axial grooves 15. If, however, control piston 8 moves upwardly with rising pressure on account of its different effective pressure surfaces, the rim 17 of sealing sleeve 9 will override the end of grooves 15 separating inlet chamber 14 and outlet chamber 16 from each other. In this position with the inlet pressure $P_1$ continuing to be increased, the outlet pressure $P_2$ will rise more slowly in a ratio related to the effective pressure surfaces of piston 8. From this results a change-over point $U_1$ corresponding to one half of the spring force of spring 10 (F/2). Thus, as seen in FIG. 3, portion A of the graph changes to a flatter portion B of the graph.

Similarly, pressure control valve 3 has a control piston 19 with a sealing sleeve 20. Control piston 19 is likewise sealed by a seal 21 to housing 1.

Spring 10 bears against a cap 22 connected with housing 1 via a flange 23. Spring 10 acts on a spring retainer 24 provided with a centering shoulder 25. Spring retainer 24 presses against the pressure members 26 and 27 which are components of a carrier bridge 28, which is formed by an axle 29 and two angular lever arms 30 and 31 fastened thereto. The bottom side of angular lever arms 30 and 31 acts on control pistons 8 and 19. The upper side of lever arms 30 and 31 forms two points of application of force 32 and 33 for the respective preloading force of the two control pistons 8 and 19. Axle 29 is supported in a bearing 34 which is rigidly fastened to housing 1 by screws 35. Additionally, axle 29 is constructed as a torsion rod, so that the two angular lever arms 30 and 31 are adapted to be turned relative to each other to a limited degree. Thus, carrier bridge 28 is resilient. The relative movement caused thereby is sufficient to have pistons 8 and 19 work independently of one another during normal operation. This relative movement is caused by the resilience of carrier bridge 28 which in effect is a lost motion arrangement.

It will now be assumed that the brake circuit associated with control piston 19 is unpressurized. In this case, the preloading force acting on the point of application 33 will act on the angular lever arm 30 via carrier bridge 28, angular lever arm 30 being therefore loaded by the total force F. As a result, the change-over point in the graph of FIG. 3 will rise up to the value $U_2$ and control piston 8 will operate in accordance with portion C of the graph. The operative brake circuit will consequently operate at a higher brake pressure. Therefore, the arrangement including carrier bridge 28 increases the force F/2 normally acting on control piston 8 to a force of F when the brake circuit associated with the control piston 19 fails. If the torsion rod 29 is constructed somewhat more resiliently, it is not the total preloading force F/2 assigned to piston 19 which will be transmitted to piston 8, but only a fragment thereof, so that, for instance, the portion D of the graph of FIG. 3 will be followed.

In the embodiment according to FIGS. 4 and 5, parts corresponding to those of FIGS. 1 and 2 have been assigned the same reference numerals increased by 100. In this arrangement, a flat spring retainer 124 acts directly on the end surfaces of the two control pistons 108 and 119, so that the points of application of force 132 and 133 are located at these end surfaces. A carrier bridge 128 composed of a U-shaped part of square cross section is inserted with its leg 130 in a square hole 136 of control piston 108 and with its leg 131 in a square hole 137 of control piston 119. The insertion is effected with a loose sliding fit. This way, the desired slight relative movement between the two control pistons is rendered possible. This arrangement also provides a lost motion arrangement. However, as soon as a predetermined travel is exceeded, the aimed-at synchronized coupling becomes effective.

In the embodiment according to FIG. 6, parts corresponding to those of FIGS. 1 and 2 have been assigned the same reference numerals increased by 200. In this case, a helical spring 210 acts with its one end via a bar-like constructed carrier bridge 228 on a point of application of force 232 of control piston 208 and with its other end via a spring retainer 236 and a direction-reversing device 239 in the form of a two-armed lever on an extension 240 of control piston 219, at the upper end of which the point of application of force 233 is situated. The one end portion 230 of carrier bridge 228 is rigidly fixed to control piston 208 by means of a circlip 241. The other end portion 231 is constructed like a fork and engages in a groove 241 of control piston 219. The width of groove 241 is such that the clearance desired for relative movement of pistons 208 and 219 during normal operation is available. This arrangement also provides a lost motion arrangement. However, a synchronized coupling becomes effective upon failure of a brake circuit.

The illustrated dual-circuit pressure control valve may have various control functions, for instance, the function of a limiting valve keeping the outlet pressure at a constant level in the event of rising inlet pressure above the change-over point, or the function of a pressure reducing valve causing the outlet pressure to rise more slowly in the event of rising inlet pressure above the change-over point. It is also possible to modify the preload load-sensitivity, for example, by using a load-sensitive movable stop instead of a rigid cap 22.

While we have described above the principles of our invention in connection with specific apparatus, it is to be clearly understood that this description is made only by way of example and not as a limitation to the scope of our invention as set forth in the objects thereof and in the accompanying claims.

We claim:

1. A dual-circuit pressure control valve comprising:
two control pistons disposed in a housing in a parallel side-by-side relationship, each of said two pistons being associated with a different one of two brake circuits; and
an arrangement associated with said housing to apply a preloading force to each of said two pistons such that, upon failure of one of said two circuits, said preloading force on that one of said two pistons associated with the other of said two circuits is increased, said arrangement including
a spring disposed adjacent at least one of said two pistons to generate said two preloading forces,
means disposed in an operative relationship with said spring and at least one of said two pistons to apply each of said two preloading force to a different one of said two pistons, and
a carrier bridge coupled to and in contact with each of said two pistons in a non-tilting manner to allow a slight relative movement between said two pistons when both of said circuits are operative to adjust the position of said means to enable synchronizing each point of application of said two preloading forces.

2. A control valve according to claim 1, wherein:
said carrier bridge interconnects said two pistons.

3. A control valve according to claim 2, wherein:
said carrier bridge includes a lost motion arrangement on at least one end thereof.

4. A control valve according to claim 1, wherein:
said means is two pressure members each acting on an end surface of an associated one of said two pistons, and
said carrier bridge interconnects said two pressure members.

5. A control valve according to claims 1, 2, 3 or 4, wherein:
said carrier bridge is resilient.

6. A control valve according to claim 1, wherein:
said carrier bridge includes:
a pivot axle extending parallel to and spaced from a plane containing a longitudinal axis of each of said two pistons, and
two lever arms each rigidly secured to opposite ends of said axle and extending therefrom to act on an end surface of an associated one of said two pistons.

7. A control valve according to claim 6, wherein:
said axle is a torsion rod.

8. A control valve according to claims 1, 2, 4, 6 or 7, wherein:
said spring is a helical spring disposed adjacent each of said two pistons, and
said means is a spring retainer overlapping both of said points of application against which said helical spring abuts.

9. A control valve according to claim 8, wherein:
said spring retainer has a centering shoulder bearing against said carrier bridge.

10. A control valve according to claim 9, wherein:
said carrier bridge is resilient.

11. A control valve according to claim 8, wherein:
said carrier bridge is resilient.

12. A control valve according to claims 1, 2 or 3, wherein:
said spring has one end thereof acting on one of said points of application and the other end thereof acting on the other of said points of application through said means in the form of a direction-reversing device.

13. A control valve according to claim 12, wherein:
said carrier bridge is resilient.

14. A dual-circuit pressure control valve comprising:
two control pistons disposed in a housing in a parallel side-by-side relationship, each of said two pistons being associated with a different one of two brake circuits;
an arrangement to apply a preloading force to each of said two pistons such that, upon failure of one of said two circuits, said preloading force on that one of said two pistons associated with the other of said two circuits is increased, said arrangement including a carrier bridge synchronizing a point of application of each of said two preloading forces by allowing a slight relative movement between said two pistons when both of said circuits are operative, said carrier bridge including
a pivot axle extending parallel to a plane containing a longitudinal axis of each of said two pistons, and
two lever arms each rigidly secured to opposite ends of said axle;
each of said two preloading forces being generated by a common helical spring; and
a spring retainer overlapping both of said points of application against which said spring abuts.

15. A control valve according to claim 14, wherein:
said spring retainer has a centering shoulder bearing against said carrier bridge.

16. A control valve according to claim 15, wherein:
said carrier bridge is resilient.

17. A control valve according to claim 14, wherein:
said carrier bridge is resilient.

18. A dual-circuit pressure control valve comprising:
two control pistons disposed in a housing in a parallel side-by-side relationship, each of said two pistons bein associated with a different one of two brake circuits;
an arrangement to apply a preloading force to each of said two pistons such that, upon failure of one of said two circuits, said preloading force on that one of said two pistons associated with the other of said two circuits is increased, said arrangement including a carrier bridge synchronizing a point of application of each of said two preloading forces by allowing a slight relative movement between said two pistons when both of said circuits are operative, said carrier bridge including:
a pivot axle extending parallel to a plane containing a longitudinal axis of each of said two pistons, and
two lever arms each rigidly secured to opposite ends of said axle,
said axle being a torsion rod;
each of said two preloading forces being generated by a common helical spring; and
a spring retainer overlapping both of said points of application against which said spring abuts.

19. A control valve according to claim 18, wherein:
said spring retainer has a centering shoulder bearing against said carrier bridge.

20. A control valve according to claim 19, wherein:
said carrier bridge is resilient.

21. A control valve according to claim 18, wherein:
said carrier bridge is resilient.

* * * * *